UNITED STATES PATENT OFFICE.

MONE R. ISAACS, OF PHILADELPHIA, PENNSYLVANIA.

ADHESIVE COMPOUND.

No. 848,746.　　　　Specification of Letters Patent.　　　　Patented April 2, 1907.

Application filed October 11, 1906. Serial No. 338,397.

*To all whom it may concern:*

Be it known that I, MONE R. ISAACS, a citizen of the United States, and a resident of the city of Philadelphia, State of Pennsylvania, have invented certain new and useful Improvements in Adhesive Compounds, of which the following is a full, clear, and complete disclosure.

The object of my invention is to produce an adhesive compound or glue from any casein or other suitable proteid and lime, which compound will not readily coagulate or disintegrate and in which a thorough distribution of the lime throughout the casein is effected.

In carrying out my invention I combine casein or other suitable proteid with lime, a suitable fluorid, and a compound of calcium and magnesium or a compound containing the silicates and aluminates of calcium and magnesium.

The proportions of the above ingredients which are mixed with casein may be varied to quite an extent with slightly-different results. If a cement or glue which will set quickly is required, the quantity of the ingredients which are mixed with the casein will be less than would be used in making a more slowly-setting glue.

The fluorid which I preferably use is the fluorid of sodium; but the fluorid of potassium, ammonium, or any other similar fluorid may be substituted without departing from the spirit and scope of my invention.

The compound of calcium and magnesium which I employ generally contains calcium silicate, calcium aluminate, magnesium silicate, and magnesium aluminate. Almost any good hydraulic cement, such as Rosedale cement or Portland cement, contains these substances in varying proportions; but I prefer to use Portland cement, since I have found that good results may be obtained from its use.

A cement or glue made in accordance with my invention and which gives good results consists of the following ingredients in the proportions stated below: casein, one hundred parts; lime, nine to fifteen parts; fluorid of soda, two to ten parts; Portland cement, two to eight parts.

It is sometimes desirable for commercial purposes to put up my improved glue or cement into separate packages, one containing the casein and the other the remaining ingredients suitably mixed together. When it is desired to use the glue, it is merely necessary to take from ten to forty parts of the compound of fluorid, lime, and Portland cement and thoroughly mix it with a suitable quantity of water and one hundred parts of casein, or in some cases it would be merely necessary to package the lime, fluorid of soda, and Portland cement, suitably proportionized, and let the user mix the same with water and any suitable casein or other proteid. In still other cases the fluorid may be mixed with the casein and the remaining ingredients separately packaged together.

While I have described the several ingredients and the manner of combining the same, I do not desire to be limited to the particular proportions and amounts of the same as above stated, since a composition of matter containing the above or similar ingredients in any proportions or quantities is fully within the scope and objects of my invention.

Having thus described my invention, what I claim, and desire to protect by Letters Patent of the United States, is—

1. An adhesive compound consisting of a proteid, lime, a fluorid, and a compound containing calcium and magnesium.

2. An adhesive compound consisting of casein, lime, a fluorid and a compound containing calcium and magnesium.

3. An adhesive compound consisting of casein, lime, a fluorid, and a compound of the silicates and aluminates of calcium and magnesium.

4. An adhesive compound consisting of casein, lime, sodium fluorid and a compound of the silicates and aluminates of calcium and magnesium.

5. An adhesive compound consisting of casein, lime sodium fluorid and hydraulic cement.

6. An adhesive compound consisting of casein, lime, sodium fluorid and Portland cement.

7. An adhesive compound consisting of casein one hundred parts, lime two to ten parts, sodium fluorid two to eight parts, Portland cement nine to fifteen parts.

8. A composition of matter to be used for making an adhesive compound consisting of lime, a fluorid and a compound of the silicates and aluminates of calcium and magnesium.

9. A composition of matter to be used for making an adhesive compound consisting of lime, sodium fluorid and a compound of the silicates and aluminates of calcium and magnesium.

10. A composition of matter to be used for making an adhesive compound consisting of lime, sodium fluorid and hydraulic cement.

11. A composition of matter to be used for making an ingredient of a casein adhesive compound consisting of lime, sodium fluorid and Portland cement.

12. An adhesive compound consisting of casein, lime, sodium fluorid, hydraulic cement and water.

13. An adhesive compound consisting of casein, lime, sodium fluorid, Portland cement and water.

14. A composition of matter to be used for making an adhesive compound, consisting of lime, sodium fluorid, a compound of the silicates and aluminates of calcium and magnesium, and water.

In witness whereof I have hereunto set my hand this 8th day of October, 1906.

MONE R. ISAACS.

Witnesses:
HARRY COBB KENNEDY,
ALEXANDER PARK.